United States Patent
Aoki

(10) Patent No.: US 9,892,643 B2
(45) Date of Patent: Feb. 13, 2018

(54) VEHICLE LIGHT EMITTING DISPLAY DEVICE AND VEHICLE DISPLAY SYSTEM

(71) Applicant: Yazaki Corporation, Minato-ku, Tokyo (JP)

(72) Inventor: Kunimitsu Aoki, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/260,430

(22) Filed: Sep. 9, 2016

(65) Prior Publication Data

US 2016/0379498 A1 Dec. 29, 2016

Related U.S. Application Data

(63) Continuation of application No. PCT/JP2015/057064, filed on Mar. 10, 2015.

(30) Foreign Application Priority Data

Mar. 10, 2014 (JP) ................................. 2014-046398

(51) Int. Cl.
*B60Q 1/00* (2006.01)
*G08G 1/16* (2006.01)
(Continued)

(52) U.S. Cl.
CPC ............. *G08G 1/166* (2013.01); *B60K 35/00* (2013.01); *B60Q 9/008* (2013.01); *B60R 1/00* (2013.01);
(Continued)

(58) Field of Classification Search
CPC .... G08G 1/166; G02B 27/0101; G02B 27/01; G02B 2027/0141; G02B 2027/014;
(Continued)

(56) References Cited

U.S. PATENT DOCUMENTS 4,806,904 A * 2/1989 Watanuki ........... G02B 27/0149 340/438
5,440,428 A 8/1995 Hegg et al.
(Continued)

FOREIGN PATENT DOCUMENTS

JP H08-115491 A 5/1996
JP 2002-120597 A 4/2002
(Continued)

OTHER PUBLICATIONS

Jun. 2, 2015—International Search Report—PCT/JP2015/057064.
Sep. 5, 2017—(JP) Notification of Reasons for Refusal—App 2014-046398.

*Primary Examiner* — Anh V La
(74) *Attorney, Agent, or Firm* — Banner & Witcoff, Ltd.

(57) ABSTRACT

A vehicle light emitting display device is provided with at least one light source which can be controlled to turn on and off and a light reflecting member disposed in front of a driver of a vehicle. The vehicle light emitting display device forms a virtual image which can be observed by the driver, by emitting light of the light source from lower side of an instrument panel of the vehicle toward the light reflecting member. The vehicle light emitting display device is further provided with a forward and rearward movable mechanism that freely moves a position, at which light is emitted from the light source toward the light reflecting member, in a forward and rearward direction which is a travel direction of the vehicle.

13 Claims, 12 Drawing Sheets

(51) Int. Cl.
  *B60K 35/00* (2006.01)
  *B60R 1/00* (2006.01)
  *B60R 21/00* (2006.01)
  *G02B 27/01* (2006.01)
  *B60Q 9/00* (2006.01)

(52) U.S. Cl.
  CPC .............. *B60R 21/00* (2013.01); *G02B 27/01* (2013.01); *G02B 27/0101* (2013.01); *B60K 2350/1056* (2013.01); *B60K 2350/2034* (2013.01); *B60K 2350/2052* (2013.01); *B60R 2300/205* (2013.01); *B60R 2300/308* (2013.01); *G02B 2027/014* (2013.01); *G02B 2027/0141* (2013.01)

(58) Field of Classification Search
  CPC ........... B60Q 9/008; B60R 1/00; B60R 21/00; B60R 2300/205; B60R 2300/308; B60K 35/00; B60K 2350/2052; B60K 2350/2034; B60K 2350/1056
  USPC .................................................. 340/435, 436
  See application file for complete search history.

(56) References Cited

U.S. PATENT DOCUMENTS

| | | | |
|---|---|---|---|
| 8,867,138 B2 | 10/2014 | Kobayashi | |
| 2002/0012173 A1* | 1/2002 | Aoki .................. | G02B 27/0101 359/630 |
| 2003/0016451 A1 | 1/2003 | Aoki et al. | |
| 2003/0214474 A1* | 11/2003 | Aoki ...................... | B60K 35/00 345/87 |
| 2012/0008048 A1* | 1/2012 | Sekine .................. | G06T 19/006 348/566 |
| 2013/0242404 A1 | 9/2013 | Kobayashi | |
| 2014/0002252 A1* | 1/2014 | Fong ...................... | B60Q 9/008 340/435 |

FOREIGN PATENT DOCUMENTS

| | | |
|---|---|---|
| JP | 2003-029196 A | 1/2003 |
| JP | 2004-168230 A | 6/2004 |
| JP | 2010-179918 A | 8/2010 |
| JP | 2012-037241 A | 2/2012 |
| JP | 2012-179935 A | 9/2012 |
| JP | 2013-203103 A | 10/2013 |
| WO | 2012-164704 A1 | 12/2012 |

* cited by examiner

VEHICLE LIGHT EMITTING DISPLAY DEVICE AND VEHICLE DISPLAY SYSTEM

CROSS REFERENCE TO RELATED APPLICATIONS

This application is a continuation of PCT application No. PCT/JP2015/057064, which was filed on Mar. 10, 2015 based on Japanese Patent Application (No. 2014-046398) filed on Mar. 10, 2014, the contents of which are incorporated herein by reference.

BACKGROUND OF THE INVENTION

Field of the Invention

The present invention relates to a vehicle light emitting display device and a vehicle display system which displays information by using reflection of light by a front windshield (window glass) or the like in front of a driver in a vehicle.

Description of Related Art

A typical vehicle head-up display (HUD) device projects beams of display light, which contain various information items to be displayed, to a front windshield or a reflective plate called a combiner via a HUD unit, and forms an optical path such that light reflected by the front windshield or the like is directed toward an eye point of a driver. Accordingly, the driver can observe a scene ahead of the vehicle through the front windshield, and can concurrently observe a virtual image displayed by the HUD which is reflected in the front windshield or the like. That is, the driver can observe various information items displayed by the HUD while maintaining a normal driving state.

In contrast, instead of using a HUD unit, a simple driver assistance system disclosed in Patent Literature 1 uses ten light emitting elements which are disposed at different positions. Light emitted from each light emitting element on a dashboard is reflected by a front windshield, and is directed toward an eye point of a driver. Accordingly, similar to a case where a HUD unit is installed, the driver can observe light emission of each light emitting element without moving their line of sight while maintaining a normal driving state. A displayer of the system disclosed in Patent Literature 1 is not capable of displaying various information items, but is capable of calling a driver's attention to any warning. The system is capable of changing the display position of a warning observed by the driver by selectively turning on and off the ten light emitting elements.

[Patent Literature 1] JP-A-Hei8-115491

According to a related art, a displayer disclosed is capable of immediately transferring the occurrence of an abnormality to the driver in a state where a driver directs their line of sight in a forward direction.

In contrast, unless the number of light emitting elements disposed on the dashboard is increased, the number of display positions of warnings is limited. Accordingly, there is a possibility of not being able to obtain a satisfactory display capability due to large errors in display positions in a situation where the display positions of warnings are very meaningful. If the number of light emitting elements is increased, the number of components is increased, and the cost increases. It may be difficult to ensure a space for disposing many light emitting elements in a vehicle, or man-hours required to perform the mounting of components may increase, which is a problem.

A typical HUD device is capable of displaying various information items, and adjusting display positions with high accuracy. Since the HUD device is required to project display light to the entire area of a somewhat large size, unless a high-output light source is used, it is not possible to sufficiently ensure display brightness. A use of a high-output light source increases power consumption or the amount of generated heat, which is a problem. In a case where display brightness is low, a driver may be highly likely to overlook a warning display. In a case where the size of a display area of the HUD device is small, the HUD device is not capable of displaying warnings at various locations, and the freedom of controlling display positions is reduced.

For example, in a case where it is detected that a human, an animal, an object, or the like has rushed onto a road ahead on the course of a host vehicle, desirably, the display position of a warning can be accurately controlled such that a driver can immediately move their line of sight to the position of a target, and pay attention to the target.

SUMMARY

According to exemplary embodiments, a vehicle light emitting display device and a vehicle display system easily provide display brightness required to call a driver's attention, and are capable of adjusting display positions with a low device cost or less man-hours for a mounting operation.

One or more embodiments provide a vehicle light emitting display device having characteristics described in aspects (1) to (10) below.

In an aspect (1), one or more embodiments provide a vehicle light emitting display device provided with at least one light source which can be controlled to turn on and off, and a light reflecting member disposed in front of a driver of a vehicle. The vehicle light emitting display device forms a virtual image which can be observed by the driver, by emitting light of the light source from lower side of an instrument panel of the vehicle toward the light reflecting member. The vehicle light emitting display device is further provided with a forward and rearward movable mechanism that freely moves a position, at which light is emitted from the light source toward the light reflecting member, in a forward and rearward direction which is a travel direction of the vehicle.

In an aspect (2), the forward and rearward movable mechanism includes a belt-shaped support member which is connected to a light emitting unit including the light source, and which is deformed and freely moves so as to block an opening portion formed in the instrument panel.

In an aspect (3), the belt-shaped support member is formed by connecting together two types of materials which are alternately disposed along a longitudinal direction of a belt shape. At least one of the two types of materials has flexibility.

In an aspect (4), the vehicle light emitting display device is further provided with guide members that respectively include guide grooves which support both end portions of the belt-shaped support member in the longitudinal direction and guide the belt-shaped support member along a predetermined movement path.

In an aspect (5), the vehicle light emitting display device is further provided with an attention-calling display control unit which controls the light source to turn on or blink in a case where a target to be called for attention is detected in a vicinity of a position of the displayed virtual image.

In an aspect (6), the attention-calling display control unit drives the forward and rearward movable mechanism so as to control to move the position of the displayed virtual image in a direction closing to a position of the target, in order to form and display the virtual image.

In an aspect (7), the light emitting unit further includes a reflective optical member that reflects light emitted from the light source and guides the light toward the light reflecting member.

In an aspect (8), the light emitting unit includes at least one annular optical member that is formed into an annular shape larger than an outer diameter of the light source and guides light emitted from the light source toward the reflective optical member by transmitting, reflecting, or diffusing.

In an aspect (9), the light emitting unit includes a plurality of the annular optical members having different sizes. The annular optical members are disposed such that the sizes of the annular optical members increase in sequence from a position of the light source toward a position of the reflective optical member.

In an aspect (10), the light emitting unit includes a turning mechanism that adjusts a direction of light emitted from the light emitting unit toward the light reflecting member according to a direction around an axis of light in a travel direction of light emitted from the light source.

According to the aspect (1), the forward and rearward movable mechanism moves in the forward and rearward direction such that the position of light, which is reflected by the light reflecting member and is observed by a driver, is moved in a vertical direction of the vehicle. That is, it is possible to freely change a display position in the vertical direction when an attention-calling warning is displayed by light emission of a light source. Accordingly, it is possible to control the display position without preparing many light sources.

According to the aspect (2), even if the forward and rearward movable mechanism moves, and a display position is changed, it is possible to block the opening portion formed in the instrument panel all the time. Accordingly, it is possible to prevent foreign matter from infiltrating into or being entrapped in the instrument panel. Since a deformable belt-shaped support member is used, it is allowed for the belt-shaped support member to easily move in the longitudinal direction of the belt-shaped support member in a state that a block state of the opening portion is maintained.

According to the aspect (3), the belt-shaped support member is facilitated to have flexibility. Accordingly, even if the direction of a movement path is curved, it is possible to dispose the belt-shaped support member, and to accommodate the device in a relatively narrow space.

According to the aspect (4), it is possible to guide the belt-shaped support member to move along a movement path determined in advance.

According to the aspect (5), a displayed virtual image enables a driver to ascertain that a target to which the driver has to pay attention is present in the vicinity of the position of the displayed virtual image.

According to the aspect (6), in a case where there is the target to which a driver has to pay attention, it is possible to bring the position of the displayed virtual image close to the target so as to notify the existence of the target. Accordingly, the driver can immediately find the target present in the vicinity of the observed displayed virtual image.

According to the aspect (7), it is possible to move the image-forming position of a displayed virtual image to a position that is far away from a driver due to the action of the reflective optical member. Accordingly, the driver can concurrently observe both of the displayed virtual image and a scene outside of the vehicle without considerably adjusting their visual focal point.

According to the aspect (8), it is possible to add an annular light emitting area to a displayed virtual image observed by a driver. Since an image of the annular light emitting area is formed at a position closer to the driver than a central portion of the displayed virtual image, it is possible to give perspective to display contents, and to three-dimensionally display the display contents.

According to the aspect (9), it is possible to three-dimensionally display a plurality of annular light emitting areas in a displayed virtual image observed by a driver. Accordingly, the driver can recognize a perspective of the displayed virtual image.

According to the aspect (10), even if the position of the installed light emitting unit cannot be changed in the rightward and leftward direction, it is possible to adjust the direction of emitted light or the image-forming position of a displayed virtual image such that the position of the displayed virtual image is coincident with an actual position of an eye point of a driver.

One or more embodiments provide a vehicle light emitting display system having characteristics described in aspects (11) to (13) below.

In an aspect (11), one or more embodiments provide a vehicle display system provided with the vehicle light emitting display device and a HUD unit. The vehicle light emitting display device is disposed on a side of the HUD unit.

In an aspect (12), the vehicle display system is further provided with a coordinated display control unit that controls a display position of the vehicle light emitting display device in coordination with an adjustment of a display position of the HUD unit.

In an aspect (13), the vehicle display system is further provided with a coordinated display control unit which controls any one of the vehicle light emitting display device and the HUD unit to selectively display information according to a position of a detected target in a rightward and leftward direction, in a case where a target to be called for attention is detected.

According to the aspect (11), a driver can observe both of a virtual image displayed by the vehicle light emitting display device and a virtual image displayed by the HUD unit. Accordingly, the driver can acquire various information items required for driving from the HUD unit, and during an emergency, the driver can observe an attention-calling display formed by the vehicle light emitting display device.

According to the aspect (12), it is possible to perform control such that the operation of the vehicle light emitting display device is coordinated with the operation of the HUD unit. It is possible to perform automatic adjustment such that one display position is changed in coordination with a change in the other display position. Accordingly, in a case where the position of an eye point of a driver is changed, it is possible to correct not only the one display position but also the other display position according to an actual eye point.

According to the aspect (13), when forming an attention-calling display, it is possible to automatically and selectively use a display formed by the vehicle light emitting display device or a display formed by the HUD unit according to the position of a target in the rightward and leftward direction. Accordingly, it is possible to form an attention-calling display at various positions in the rightward and leftward direction.

According to one or more embodiments, it is easy to obtain display brightness required to call a driver's attention, and it is possible to adjust a display position, and to reduce the cost of the device or man-hours for mounting the device.

one or more embodiments have been briefly described. Details of one or more embodiments become more apparent when the entirety of modes to be described below are read with reference to the accompanying drawings.

DETAILED DESCRIPTION

Specific embodiments of a vehicle light emitting display device and a vehicle display system in the present invention will be described with reference to the accompanying drawings.

First Embodiment

Outline of State of Disposition and Configuration of Device

Figure 1:
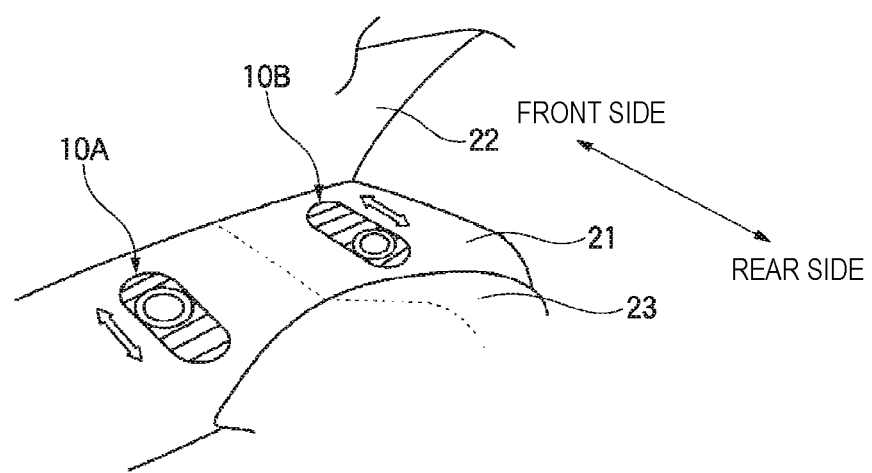
FIG. 1 is a perspective view illustrating a state in which a device is disposed inside of a vehicle equipped with a vehicle light emitting display device.
Figure 2:
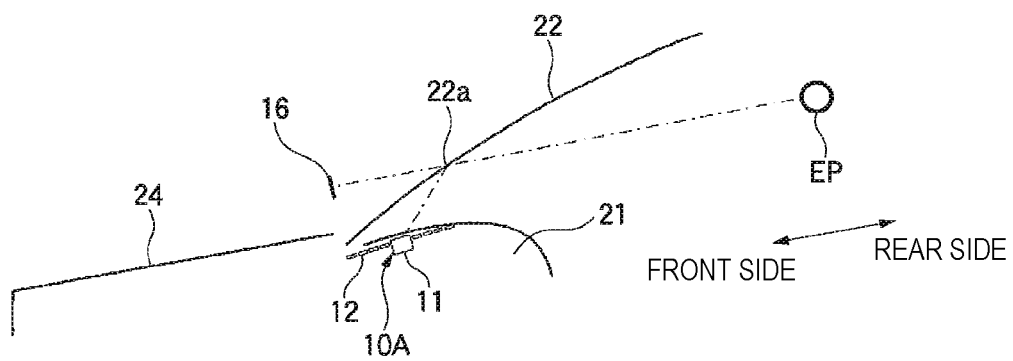
FIG. 2 is a simplified longitudinal sectional view illustrating the state of a disposition of the device, in which the vehicle equipped with the vehicle light emitting display device is viewed from the side.
Figure 3:
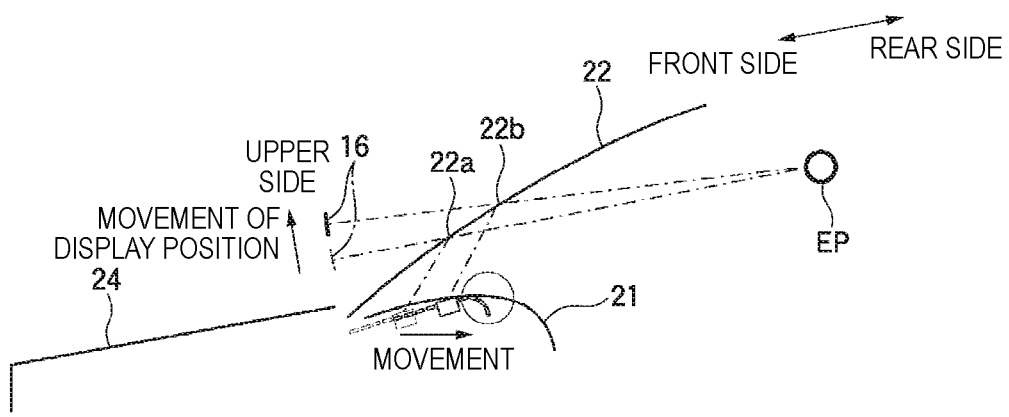
FIG. 3 is a simplified longitudinal sectional view illustrating the movement of the vehicle light emitting display device illustrated in FIG. 2 in a forward and rearward direction and a change in an optical path.

FIG. 1 illustrates a state in which a location in front of a driver's seat is viewed diagonally from the top in a passenger compartment of a vehicle equipped with vehicle light emitting display devices 10A and 10B. FIGS. 2 and 3 are sectional views illustrating the layout of portions in which the vehicle equipped with the vehicle light emitting display devices 10A and 10B is viewed from the side.

As illustrated in FIG. 1, in this example, two sets of vehicle light emitting display devices 10A and 10B are installed in a state where a portion of each of the vehicle light emitting display devices 10A and 10B is exposed on the top of an instrument panel 21 in front of a meter hood 23. One vehicle light emitting display device 10A is disposed on the left side of a central portion of the meter hood 23. The other vehicle light emitting display device 10B is disposed on the right side of the central portion of the meter hood 23. The two sets of vehicle light emitting display devices 10A and 10B are disposed spaced away from each other in a rightward and leftward direction.

Actually, respective bodies of the vehicle light emitting display devices 10A and 10B are disposed inside of the instrument panel 21. A portion of the vehicle light emitting display device 10A and a portion of the vehicle light emitting display device 10B are exposed from respective opening portions which are formed in the instrument panel 21. The opening portions of the instrument panel 21 are blocked all the time by the vehicle light emitting display devices 10A and 10B.

The two sets of vehicle light emitting display devices 10A and 10B emit display light upward from the opening portions of the instrument panel 21. As illustrated in FIG. 2, a front windshield (window glass) 22 is irradiated with the light emitted from the vehicle light emitting display device 10A, and light reflected by the front windshield 22 is directed toward the position of an eye point EP of a driver. The foregoing description is also applied to the vehicle light emitting display device 10B.

In a case where an internal light source of the vehicle light emitting display device 10A emits light to display an attention-calling display, the driver can observe a point-shaped attention calling display 16, which is equivalent to light emission of the light source, from the position of the eye point EP. As illustrated in FIG. 2, an image of the attention-calling display 16 is formed as a virtual image positioned in front of a reflection point 22a on the front windshield 22.

Accordingly, the driver can observe the attention-calling display 16 superimposed on a scene ahead of a bonnet 24 outside of the vehicle while observing the scene through the front windshield 22 while driving. In the embodiment, light emitted from the vehicle light emitting display devices 10A and 10B is reflected by the front windshield 22. Alternatively, a special reflective plate called a combiner may be used instead of the front windshield 22.

Each of the vehicle light emitting display devices 10A and 10B includes an attention-calling displayer 11 that is supported by a belt-shaped support member 12 having a movable structure illustrated in FIG. 2. As illustrated in FIG. 3, the position of the attention-calling displayer 11 can be changed, and the attention-calling displayer 11 can be moved in a forward and rearward direction. If the position of the attention-calling displayer 11 is moved, as illustrated in FIG. 3, the light-emitting position of the attention-calling displayer 11 is changed, and accordingly, an optical path is also changed.

For example, in a case where the attention-calling displayer 11 is present at a relatively front position, light emitted from the attention-calling displayer 11 is reflected at the reflection point 22*a* of the front windshield 22 illustrated in FIG. 3, and is directed toward the eye point EP of the driver. Therefore, a virtual image of the attention-calling display 16 is formed at a relatively low position in a vertical direction. If the attention-calling displayer 11 is moved relatively rearward, light emitted from the attention-calling displayer 11 is reflected at a reflection point 22*b* of the front windshield 22 illustrated in FIG. 3, and is directed toward the eye point EP of the driver. Therefore, a virtual image of the attention-calling display 16 is formed at a relatively high position in the vertical direction. That is, the display position of the attention-calling display 16 observed by the driver can be changed in the vertical direction. Since the position of the attention-calling displayer 11 in the forward and rearward direction can be freely changed, the display position of the attention-calling display 16 can be moved to various positions in the vertical direction.

<Description of Support Structure for Device>

Figure 4:
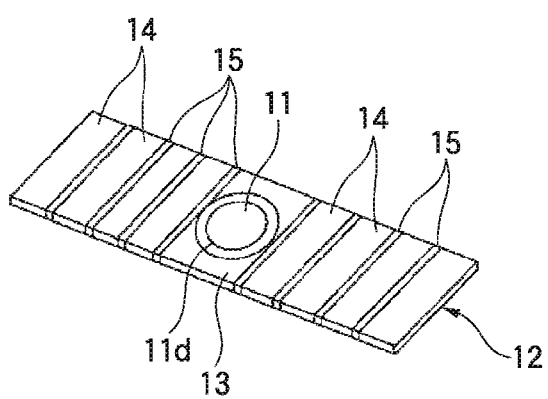
FIG. 4 is a perspective view illustrating an exterior of a belt-shaped support member that supports the vehicle light emitting display device.

FIG. 4 illustrates an exterior of the belt-shaped support member 12 that supports each of attention-calling displayers 11A and 11B. As illustrated in FIG. 4, the belt-shaped support member 12 is formed into a belt shape by alternately disposing rectangular thin plate-shaped hard material portions 14 and rectangular thin plate-shaped flexible material portions 15, and by connecting together a plurality of hard material portions 14, which are adjacent to each other in a longitudinal direction, via the flexible material portions 15. A central member 13 for mounting the attention-calling displayer 11 is disposed in a central portion of the belt-shaped support member 12. An opening portion is formed in the central member 13, and the attention-calling displayer 11 is fixed to the location of the opening portion via an annular bezel 11*d*. A transparent cover for blocking the opening portion is disposed at an exposed location of a surface of the attention-calling displayer 11.

Figure 5:
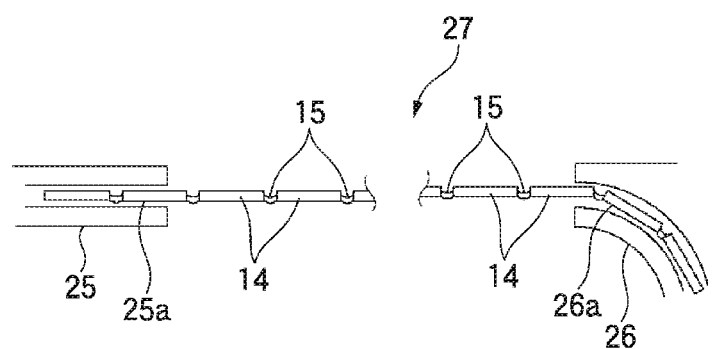
FIG. 5 is a simplified longitudinal sectional view illustrating a mounting state of the belt-shaped support member illustrated in FIG. 4.

FIG. 5 is a longitudinal sectional view illustrating a state in which the belt-shaped support member 12 is mounted in the instrument panel 21 when viewed from the side. Relatively large instrument panel opening portions 27 are formed in the instrument panel 21 such that light emitted from the mounting vehicle light emitting display devices 10A and 10B is not blocked over a predetermined entire range of movement. As illustrated in FIG. 5, bezels 25 and 26 for mounting the belt-shaped support member 12 are disposed in a circumferential portion of each of the instrument panel opening portions 27. Guide grooves 25*a* and 26*a* are respectively formed in the bezels 25 and 26 so as to guide the belt-shaped support member 12 in a state where the belt-shaped support member is capable of moving along a predetermined movement path.

That is, the belt-shaped support member 12 is supported in a state in which both end portions of the belt-shaped support member 12 in the longitudinal direction are respectively engaged with the guide groove 25*a* of the bezel 25 and the guide groove 26*a* of the bezel 26, and the belt-shaped support member 12 is capable of moving along the shapes of the guide grooves 25*a* and 26*a* in the longitudinal direction (forward and rearward direction). In a configuration example illustrated in FIG. 5, the guide groove 26*a* of the bezel 26 forms a curved movement path such that the belt-shaped support member 12 is capable of moving a long distance in a relatively narrow space.

Since a plurality of the hard material portions 14 are connected together via the flexible material portions 15, the entire belt-shaped support member 12 has flexibility, and can be easily deformed particularly in a thickness direction. Accordingly, the belt-shaped support member 12 is capable of moving along the curved guide groove 26*a* while being deformed as illustrated in FIG. 5.

Since the belt-shaped support member 12 has a belt shape, even while the belt-shaped support member 12 moves together with the attention-calling displayer 11 in the longitudinal direction, the belt-shaped support member 12 is capable of maintaining a state in which the instrument panel opening portion 27 is blocked all the time. Accordingly, it is possible to prevent foreign matter from infiltrating into or being entrapped in the instrument panel opening portion 27.

In the example illustrated in FIG. 5, the bezels 25 and 26 are used to support the belt-shaped support member 12 on the instrument panel 21 in a state where the belt-shaped support member 12 is capable of moving. Alternatively, if guide grooves for supporting and guiding the belt-shaped support member 12 are formed in the instrument panel 21, it is possible to omit the bezels 25 and 26.

<Specific Display Example of Attention-Calling Display 16>

Figure 6:
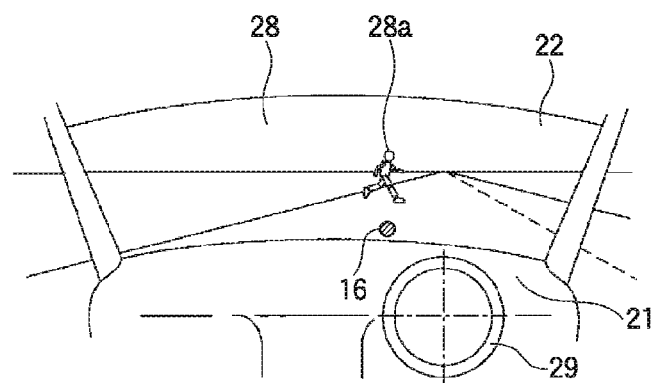
FIG. 6 is a front view illustrating a state in which a scene ahead of the vehicle is viewed from a passenger compartment of the vehicle.
Figure 7:
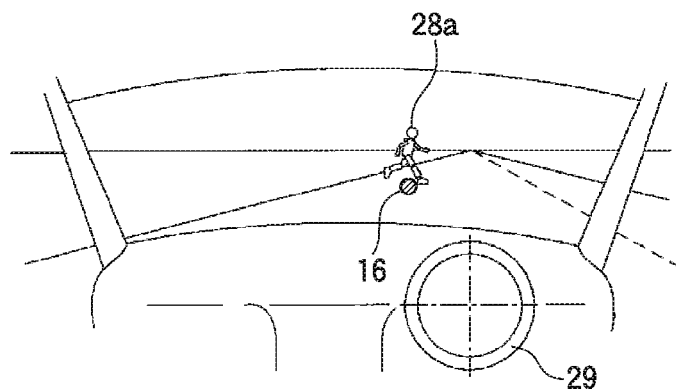
FIG. 7 is a front view illustrating a state in which a scene ahead of the vehicle is viewed from the passenger compartment of the vehicle.
Figure 8:
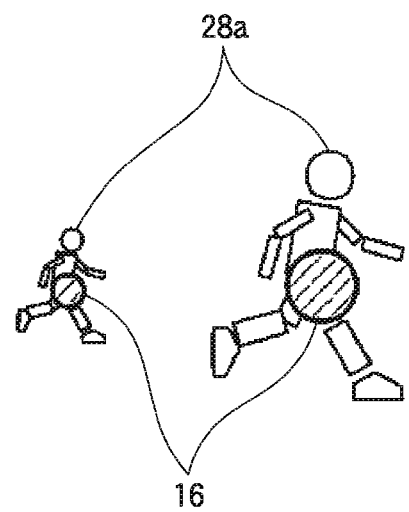
FIG. 8 is a front view illustrating an example of a positional relationship between an attention target and an attention-calling display.

Each of FIGS. 6 and 7 illustrates a state in which a scene ahead of the vehicle is viewed from the passenger compartment of the vehicle equipped with the vehicle light emitting display devices 10A and 10B. FIG. 8 illustrates an example of a positional relationship between an attention target and an attention-calling display.

For example, in a case where an in-vehicle camera captures an image of a vehicle outside scene 28 as illustrated in FIG. 6, the device is capable of automatically detecting an attention target 28*a* such as a human who rushes onto a road ahead. In a case where the device detects the attention target 28*a*, the device desirably displays the attention-calling display 16 in a visual field ahead as illustrated in FIG. 6 so as to draw a driver's attention. Accordingly, even if the attention of the driver is distracted, the driver can immediately find the attention target 28*a*.

When the attention-calling display 16 is displayed, as illustrated in FIG. 2, the attention-calling displayer 11 emits light upward. The light is reflected by the front windshield 22, and is directed toward the eye point EP of the driver, and thus, the driver can observe the attention-calling display 16 as point-shaped emitted light corresponding to a light source.

If the attention-calling displayer 11 is moved in the forward and rearward direction, the display position of the attention-calling display 16 is changed in the vertical direction as illustrated in FIG. 3, and as a result, it is possible to control the position of the attention-calling display 16 in the vertical direction. Accordingly, it is possible to move the position of the attention-calling display 16 from the position illustrated in FIG. 6 to the position illustrated in FIG. 7. That is, it is possible to bring the attention-calling display 16 close to the position of the attention target 28*a*. Since the attention-calling display 16 is brought close to the attention target 28*a*, the driver can observe the attention-calling display 16, and more immediately notice the attention target 28*a* present in the vicinity of the attention-calling display 16.

As illustrated in FIG. 8, the point-shaped attention-calling display 16 may be displayed at a position at which the point-shaped attention-calling display 16 is superimposed on the actual attention target 28*a*. If light emission brightness of the attention-calling display 16 is excessively high, adversely, the driver has difficulties in observing the attention target 28*a*, and thus, it is necessary to suitably adjust the brightness. In the configuration illustrated in FIG. 1, since the two vehicle light emitting display devices 10A and 10B disposed in the rightward and leftward direction are provided, as illustrated in FIG. 8, it is possible to concurrently display two attention-calling displays 16 via the two vehicle light emitting display devices 10A and 10B.

<Configuration of Electric Circuit>

Figure 9:
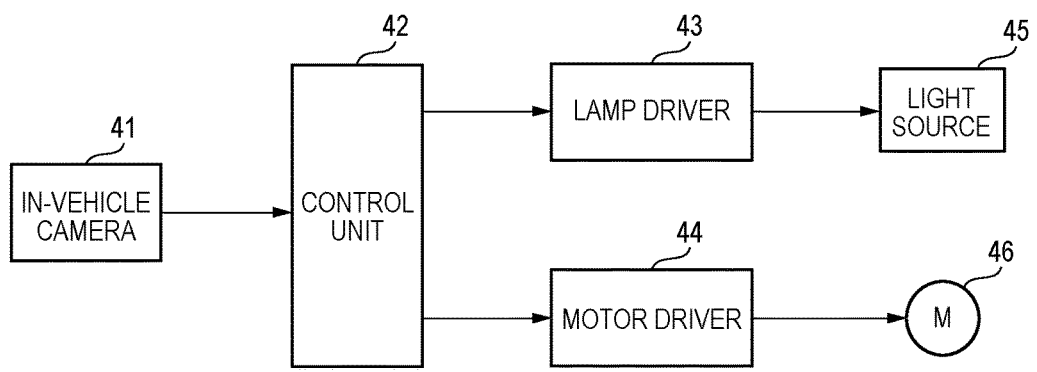
FIG. 9 is a block diagram illustrating the configuration of an electric circuit of the vehicle light emitting display device.

FIG. 9 illustrates a configuration example of an electric circuit of the vehicle light emitting display device 10A. The vehicle light emitting display device 10B also has the same configuration illustrated in FIG. 9. Alternatively, it can be considered that the two sets of vehicle light emitting display devices 10A and 10B share a portion of the configuration.

As illustrated in FIG. 9, the vehicle light emitting display device 10A includes an in-vehicle camera 41; a control unit 42; a lamp driver 43; a motor driver 44; a light source 45; and an electric motor 46.

The vehicle is equipped with the in-vehicle camera 41, and the in-vehicle camera 41 is capable of continuously capturing a video of the vehicle outside scene 28 illustrated in FIG. 6. It is possible to automatically recognize the attention target 28*a* such as a human having a characteristic shape, and to specify the position of the attention target 28*a* via image processing of the video captured by the in-vehicle camera 41, for example, via a pattern recognition technique. Naturally, it is possible to detect the attention target 28*a* using a device other than the in-vehicle camera 41.

The control unit 42 is formed as a microcomputer, and executes various controls required by the vehicle light emitting display device 10A by executing an embedded program. For example, the control unit 42 determines whether there is the attention target 28*a*, and determines the position of the attention target 28*a* by analyzing the video captured by the in-vehicle camera 41. The control unit 42 turns on or off the display of the attention-calling display 16, or controls the display position of the attention-calling display 16.

The light source 45 is formed as a lamp such as a light emitting diode, the turn-on and off of which can be controlled. The light source 45 is built into the attention-calling displayer 11 illustrated in FIG. 2, and light obtained by light emission of the light source 45 is emitted from an upper surface of the attention-calling displayer 11 toward the front windshield 22 above the attention-calling displayer 11.

The electric motor 46 is connected to the belt-shaped support member 12, and the electric motor 46 can be driven to move the belt-shaped support member 12 in the longitudinal direction (forward and rearward direction). It is possible to relatively simply control the position or the amount of movement of the attention-calling displayer 11 by using a stepping motor as the electric motor 46.

The lamp driver 43 is capable of controlling energization and non-energization of the light source 45 according to control signals output from the control unit 42. The motor driver 44 moves the respective positions of the attention-calling displayer 11 and the belt-shaped support member 12 in the forward and rearward direction by driving the electric motor 46 according to control signals output from the control unit 42.

<Control Operation of Vehicle Light Emitting Display Device>

Figure 10:
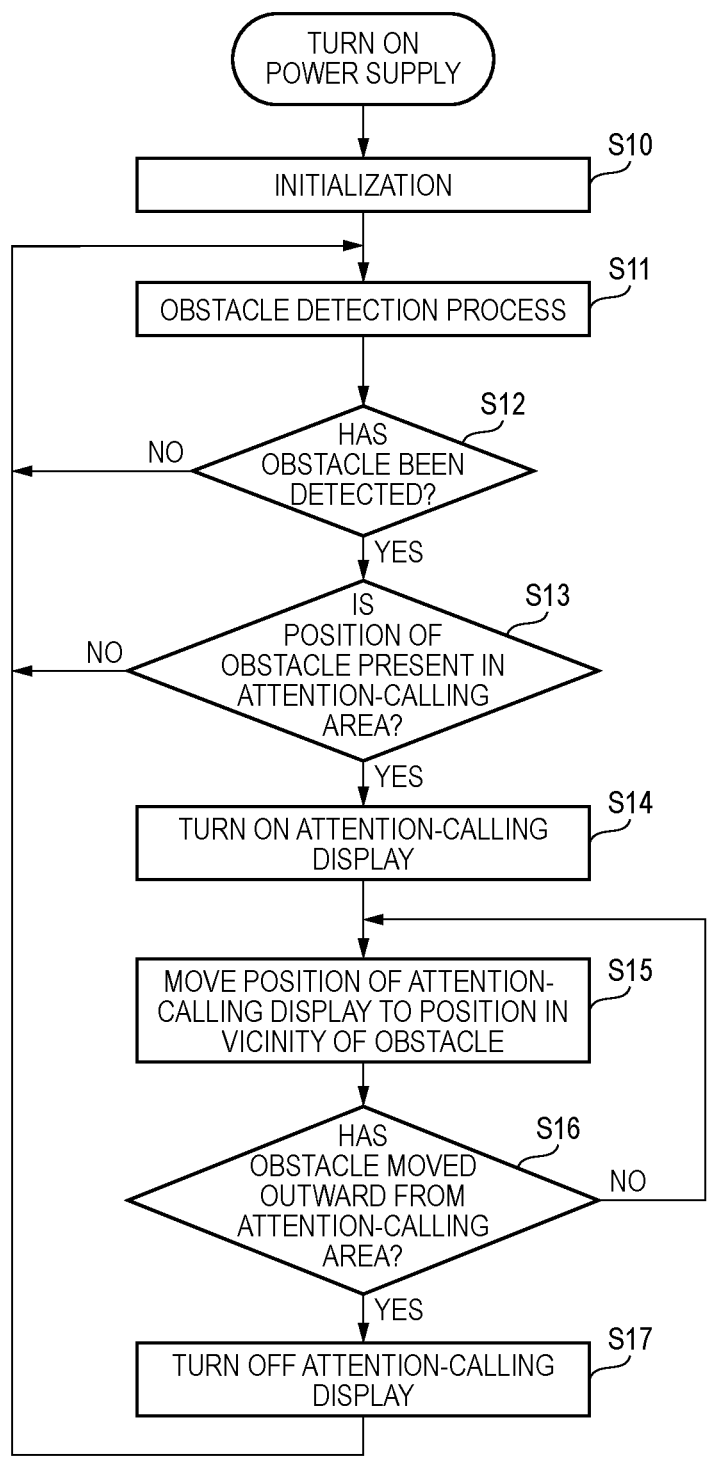
FIG. 10 is a flowchart illustrating main operations of the vehicle light emitting display device.

FIG. 10 illustrates main operations of the vehicle light emitting display device 10A. That is, the control unit 42 of the vehicle light emitting display device 10A executes control illustrated in FIG. 10. The operation of the vehicle light emitting display device 10B is also the same as that illustrated in FIG. 10.

If a power supply of the vehicle light emitting display device 10A is turned on, first, the control unit 42 executes a predetermined initialization in Step S10. In order to initialize the device, the lamp driver 43 controls the light source 45 such that the light source 45 is not energized and is turned off. The electric motor 46 is driven by the motor driver 44 such that the respective positions of the attention-calling displayer 11 and the belt-shaped support member 12 in the forward and rearward direction are positioned at initial positions determined in advance.

At next Step S11, the control unit 42 detects an obstacle (object) such as the attention target 28*a* in FIG. 6 ahead of a host vehicle by processing information regarding the video captured by the in-vehicle camera 41, and by performing pattern recognition on the processed information. In a case where the obstacle is detected, the process proceeds from Step S12 to Step S13.

In Step S13, the control unit 42 compares the position of the obstacle detected in S11 to the position of an "attention-calling area" determined in advance. The "attention-calling area" is set in the vicinity of an area in which the attention-calling display 16 can be displayed. For example, since the position of the attention target 28*a* in the rightward and leftward direction is close to the position of the attention-calling display 16 in the state illustrated in FIG. 6, it is possible to induce the driver's line of sight to the attention target 28*a* using attention-calling display 16. The "attention-calling area" is set in advance so as to determine whether the state illustrated in FIG. 6 is encountered. In a case where the obstacle is detected in the range of the "attention-calling area", the process proceeds to next S14.

In Step S14, the control unit 42 controls the lamp driver 43 such that the light source 45 is energized, and the state of the light source 45 is switched to a light-emitting state. Accordingly, light emitted from the light source 45 is emitted from the attention-calling displayer 11, is reflected by a surface of the front windshield 22, and is incident on the eye point EP of the driver. That is, the driver can observe the attention-calling display 16.

In Step S15, the control unit 42 moves the display position of the attention-calling display 16 displayed in S14 close to the position of the detected attention target 28*a*. Specifically, the electric motor 46 is driven to move the position of the attention-calling displayer 11 in the forward and rearward direction such that the position of the attention-calling display 16 is moved in the vertical direction. Control is performed to reduce a distance between the position of the attention target 28*a* and the position of the attention-calling display 16 in the vertical direction. Accordingly, it is possible to change the display position of the attention-calling display 16 from the position illustrated in FIG. 6 to the position illustrated in FIG. 7.

In Step S16, the control unit 42 monitors a change in the position of the obstacle detected in S11, and determines whether the latest position of the obstacle is moved outward from the "attention-calling area". In a case where the position of the obstacle is present inside of the "attention-calling area", the control unit returns to S15, and controls the display position of the attention-calling display 16 such that the display position of the attention-calling display 16 follows the latest position of the obstacle.

In a case where the position of the obstacle is moved outward from the "attention-calling area", the process proceeds from S16 to S17. The control unit 42 turns off the attention-calling display 16. That is, the lamp driver 43 controls the light source 45 such that the light source 45 is not energized.

The vehicle light emitting display device in the first embodiment is capable of freely changing the display position of an attention-calling warning in the vertical direction when displaying the attention-calling warning by light emission of a light source. Accordingly, it is possible to control the display position without preparing many light sources.

Second Embodiment

Configuration of Mechanism Unit

Figure 11:
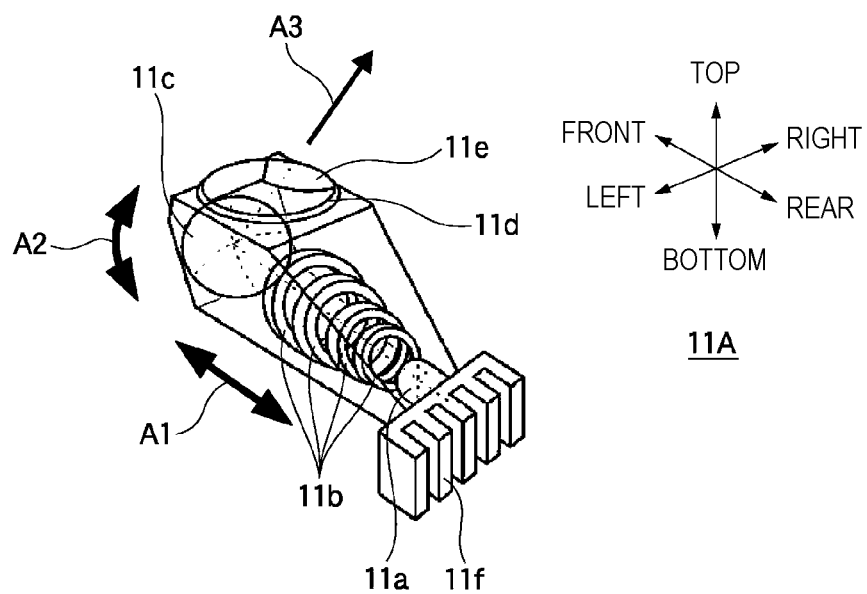
FIG. 11 is a perspective view illustrating a configuration example of an attention-calling displayer included in a vehicle light emitting display device.

FIG. 11 illustrates a configuration example of an attention-calling displayer 11A included in a vehicle light emitting display device. Instead of the attention-calling displayer 11 illustrated in FIGS. 2 and 4, the attention-calling displayer 11A can be mounted and used in the belt-shaped support member 12.

As illustrated in FIG. 11, the attention-calling displayer 11A includes a center light 11a; a plurality of light rings 11b; a magnifying mirror 11c; a bezel 11d; a transparent cover 11e; and a heat sink 11f.

The center light 11a is equivalent to the light source 45 illustrated in FIG. 9, and emits light required to display the attention-calling display 16. A high-output light source is used as the center light 11a so as to obtain a high attention-calling effect, and thus, generates a relatively large amount of heat. The heat sink 11f is disposed in the vicinity of the center light 11a so as to reduce an increase in temperature caused by the heat generation.

Each of a plurality of the light rings 11b is formed into a circular annular shape having a size larger than the outer diameter of the center light 11a. A plurality of the light rings 11b are disposed between the center light 11a and the magnifying mirror 11c such that an optical path of light from the center light 11a toward the magnifying mirror 11c is surrounded by a plurality of the light rings 11b. The light rings 11b are members having an optical function such as any one of the transmittance, reflection, and diffusion of light, or a combination of these. That is, a portion of light emitted from the center light 11a travels toward the magnifying mirror 11c through the light rings 11b, and forms a new optical path other than a main optical path of the center light 11a.

A plurality of the light rings 11b are formed into circular annular shapes having different outer diameters. As illustrated in FIG. 11, a plurality of the light rings 11b are disposed side by side and spaced away from each other in a direction from the center light 11a toward the magnifying mirror 11c in a state where the outer diameters are gradually increased in that direction. The shape of each of the light rings 11b is not limited to a circular annular shape, and may be formed into an annular exterior shape such as a rectangular annular shape or a polygonal annular shape. The shape of each of the light rings 11b is not an annular shape, and may be one side (straight line, curved line (parenthesis shape), or the like).

The magnifying mirror 11c is formed as a concave mirror or a non-spherical mirror, and has the function of moving the image-forming position of a virtual image of the attention-calling display 16 to a position that is far away from the eye point EP. Light emitted from the center light 11a is reflected by a surface of the magnifying mirror 11c, is emitted in a direction illustrated by an arrow A3, and is directed toward the front windshield 22.

A predetermined turning mechanism (not illustrated) is connected to the magnifying mirror 11c. The turning mechanism is capable of turning the magnifying mirror 11c in a direction (the direction of an arrow A2) around the axis of light that is incident on the magnifying mirror 11c from the center light 11a, and includes a drive unit such as an electric motor. If the magnifying mirror 11c turns, the direction (the direction of the arrow A3) of light emitted from the magnifying mirror 11c is also changed. It is possible to move the display position of the attention-calling display 16 in the rightward and leftward direction, or to adjust the image-forming position according to a change in the position of the eye point EP of the driver by using the turning mechanism.

The turning mechanism may be a type of turning mechanism that turns the entire attention-calling displayer 11A in the same direction instead of turning the magnifying mirror 11c. That is, it is a matter of importance that the turning mechanism has the function of turning the direction (illustrated by A3) of light emitted from the attention-calling displayer 11A in the direction A2.

The bezel 11d is formed into a circular annular shape having a size slightly larger than the outer diameter of the magnifying mirror 11c, and an opening is formed in a central portion of the bezel 11d. The bezel 11d is used to fix the attention-calling displayer 11A to the belt-shaped support member 12. Light incident on the bezel 11d from a magnifying mirror 11c side is reflected by a portion of the bezel 11d, and is emitted in the direction A3.

The transparent cover 11e is mounted so as to block the location of an opening portion inside of the bezel 11d. Light reflected by the magnifying mirror 11c transmits through the transparent cover 11e, and is emitted from the attention-calling displayer 11A in the direction of the arrow A3.

<Specific Example of Attention-Calling Display>

Figure 12:
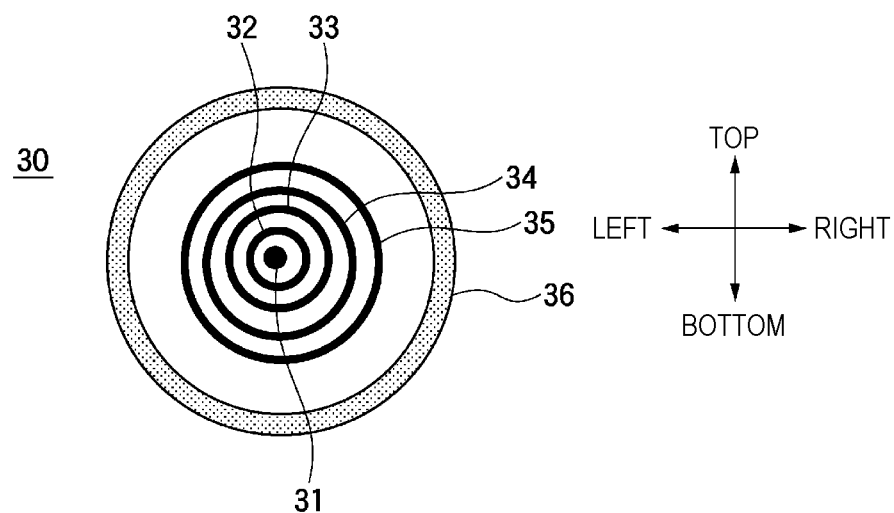
FIG. 12 is a front view illustrating a specific example of an attention-calling display that is observed at the position of an eye point of a driver.
Figure 13:
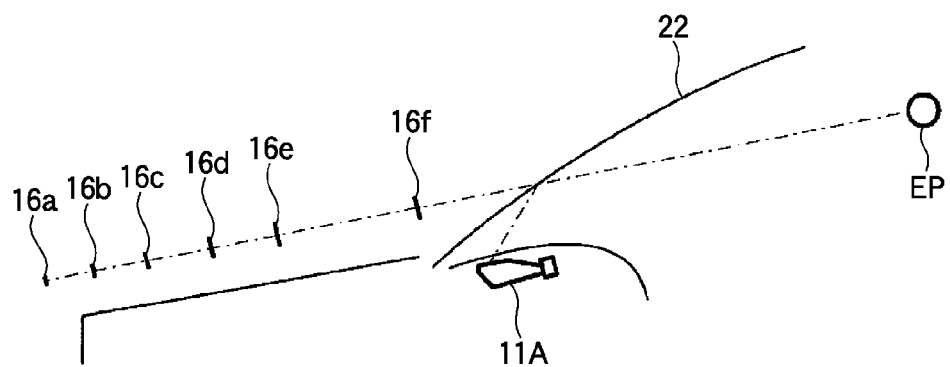
FIG. 13 is a simplified longitudinal sectional view illustrating an optical path of light for the attention-calling display, and the position of each formed virtual image.
Figure 14:
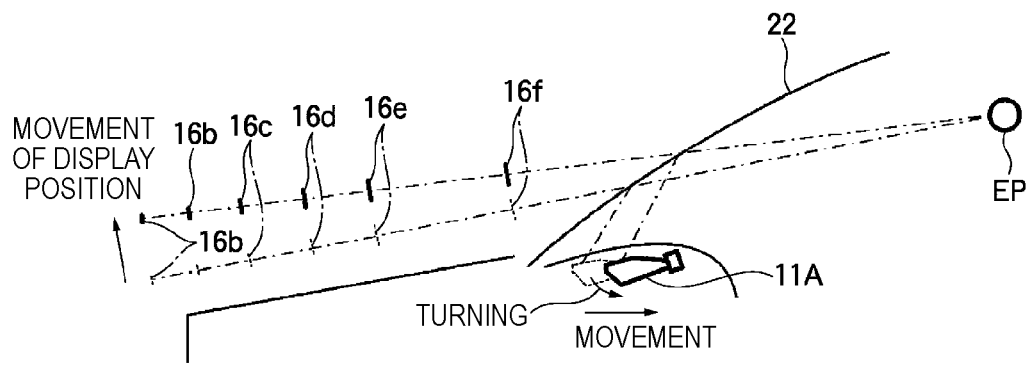
FIG. 14 is a simplified longitudinal sectional view illustrating a change in the optical path and the positions of the virtual images when the vehicle light emitting display device moves in the forward and rearward direction.

FIG. 12 illustrates a specific example of an attention-calling display 30 that is observed at the position of the eye point EP of the driver owing to light emitted from the attention-calling displayer 11A illustrated in FIG. 11. FIGS. 13 and 14 illustrate an optical path of light for the attention-calling display 30, and the position of each formed virtual image.

In the attention-calling display 30 illustrated in FIG. 12, a point-shaped central light-emitting portion 31 is formed in a central portion of the attention-calling display 30, four intermediate annular display portions 32, 33, 34, and 35 are concentrically formed at the circumference of the central light-emitting portion 31, and an annular outer circumferential display portion 36 is formed on an outermost side.

The central light-emitting portion 31 of the attention-calling display 30 illustrated in FIG. 12 is equivalent to an area having the highest brightness which is directly obtained by light emission of the center light 11a. An image of the central light-emitting portion 31 is formed at the position of a virtual image 16a illustrated in FIG. 13.

The four intermediate annular display portions 32, 33, 34, and 35 correspond to light which is emitted from the center light 11a, passes through any one of the four light rings 11b, is reflected by the magnifying mirror 11c, and then is directed toward the front windshield 22. That is, the driver observes light emission of the light rings 11b as the intermediate annular display portions 32, 33, 34, and 35. Since the four light rings 11b are disposed at different positions between the center light 11a and the magnifying mirror 11c, images of the intermediate annular display portions 32, 33, 34, and 35 are respectively formed at the positions of virtual images 16b, 16c, 16d, and 16e illustrated in FIG. 14.

The outer circumferential display portion 36 of the attention-calling display 30 corresponds to light which is emitted from the center light 11a, is reflected by the magnifying mirror 11c, is reflected by the location of the bezel 11d, and then is directed toward the front windshield 22. That is, the driver observes light emission of the bezel 11d as the outer circumferential display portion 36. Since the bezel 11d is positioned closer to the front windshield 22 than the light ring 11b, an image of the outer circumferential display portion 36 is formed at the position of a virtual image 16f close to the front windshield 22.

The attention-calling displayer 11A illustrated in FIG. 11 is capable of moving in the forward and rearward direction (direction A1) or is capable of changing a light emitting direction in a turning direction (the direction A2). As illustrated in FIG. 14, the optical path is changed according to such a change. The respective image-forming positions of the virtual images 16a, 16b, 16c, 16d, 16e, and 16f are also changed. Accordingly, it is possible to move the display position of the attention-calling display 30 in the vertical direction and the rightward and leftward direction, and to adjust the light emitting direction according to a change in the position of the eye point EP of the driver.

Third Embodiment

Configuration and Exterior of Mechanism Unit

Figure 15:
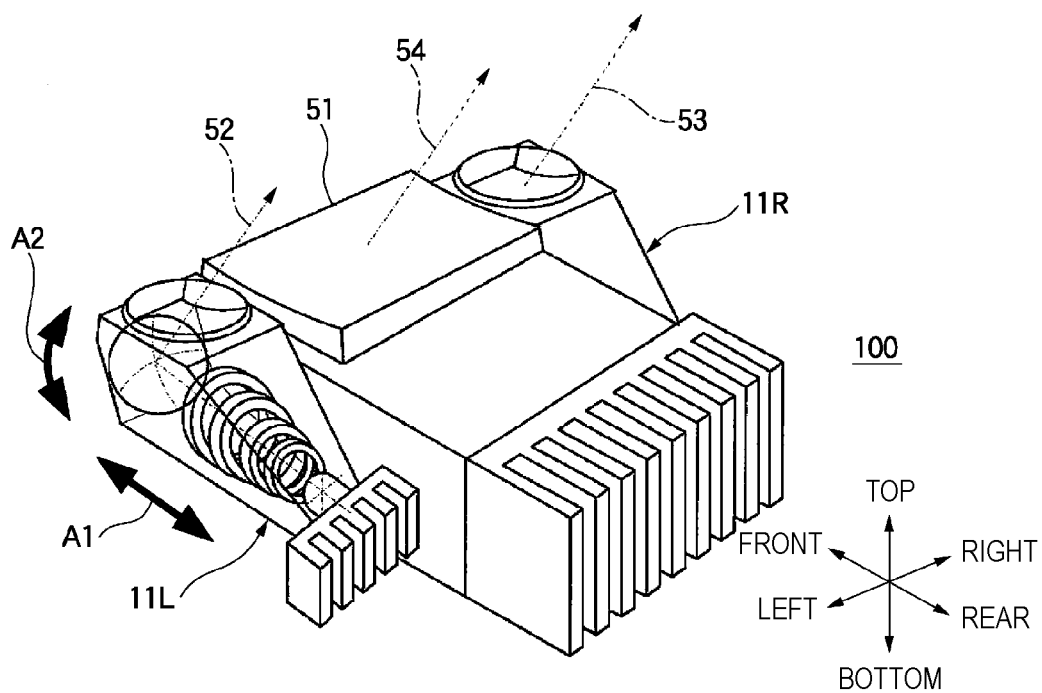
FIG. 15 is a perspective view illustrating a specific example of an exterior of a vehicle display system.
Figure 16:
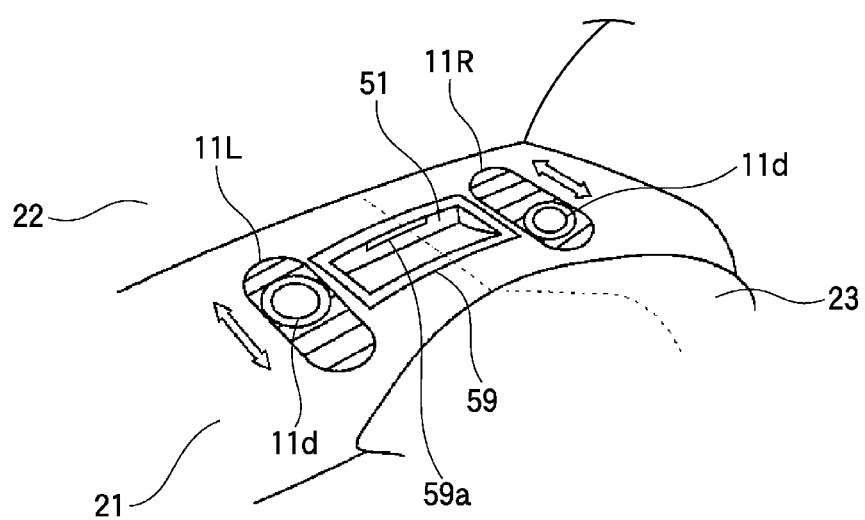
FIG. 16 is a perspective view illustrating a configuration example of the vicinity of an instrument panel of a vehicle equipped with the vehicle display system.

FIG. 15 illustrates a specific example of an exterior of a vehicle display system 100 including the vehicle light emitting display device. FIG. 16 illustrates a configuration example of the vicinity of an instrument panel of a vehicle equipped with the vehicle display system 100.

The vehicle display system 100 illustrated in FIG. 15 includes a HUD unit 51 disposed in a central portion, and attention-calling displayers 11R and 11L which are respectively disposed on right and left sides of the HUD unit 51. Similar to a typical vehicle head-up display (HUD) device, the HUD unit 51 has the function of displaying images of various text information items or various symbols, which aid the driving of the vehicle, as virtual images ahead of a visual field of the driver by projecting the images on the front windshield 22 or the like. That is, the HUD unit 51 is different from the vehicle light emitting display devices 10A and 10B in that the HUD unit 51 is capable of not only turning on and off a simple display but also displaying various items of visible information in a certain area as necessary. Each of the attention-calling displayers 11R and 11L illustrated in FIG. 15 is a configuration element that has the same function as that of the attention-calling displayer 11A.

As illustrated in FIG. 16, the HUD unit 51 is accommodated inside of the instrument panel 21 in front of the meter hood 23. A rectangular opening portion is formed in the instrument panel 21, and a HUD bezel 59 having a rectangular exterior shape is mounted at the location of the opening portion. The HUD unit 51 is fixed to the instrument panel 21 via the HUD bezel 59.

The HUD unit 51 is capable of emitting display light for visible information to be displayed from the opening portion of the instrument panel 21, that is, an area inside of the HUD bezel 59 toward the front windshield 22 thereabove. That is, the HUD unit 51 emits light in a light emitting direction 54 illustrated in FIG. 15. The area inside of the HUD bezel 59, through which light is emitted, is covered with a transparent cover. A special light source 59a controllable by the HUD unit is mounted in a portion of the HUD bezel 59. Attention-calling information can be displayed in the vicinity of the center of an area, in which information is displayed by the HUD unit 51, by light emission of the light source 59a.

As illustrated in FIG. 16, the attention-calling displayer 11L is disposed on the left side of the HUD unit 51, and is accommodated inside of the instrument panel 21. The attention-calling displayer 11R is disposed on the right side of the HUD unit 51, and is accommodated inside of the instrument panel 21. A support structure for each of the attention-calling displayers 11R and 11L is the same as that of the first embodiment.

<Display Example of Attention-Calling Display 16>

Figure 17:
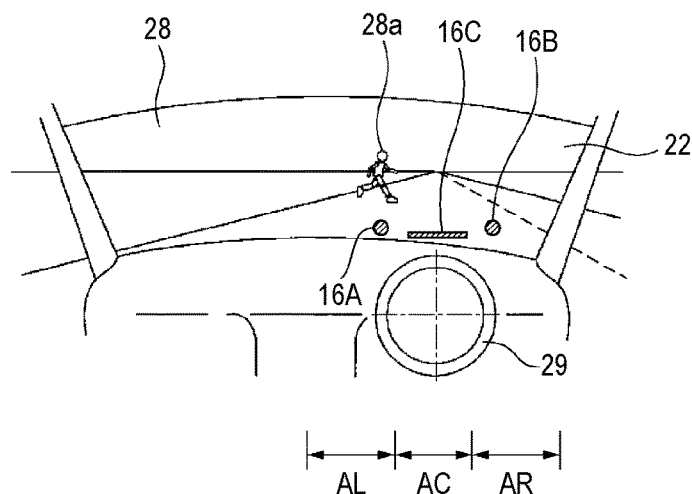
FIG. 17 is a front view illustrating a state in which a scene ahead of the vehicle is viewed from the passenger compartment of the vehicle.

FIG. 17 illustrates a specific example in which a scene ahead of the vehicle is viewed from the passenger compartment of the vehicle equipped with the vehicle display system 100.

The vehicle equipped with the vehicle display system 100 illustrated in FIGS. 15 and 16 is capable of displaying an attention-calling display 16C in a central portion via the HUD unit 51. That is, if the light source 59a illustrated in FIG. 16 is turned on, emitted light is reflected by the front windshield 22, and is directed toward the eye point EP of the driver. Therefore, a portion of the HUD bezel 59 is displayed brightly as a virtual image of the light source 59a.

It is possible to display a point-shaped attention-calling display 16A or a concentric pattern of attention-calling display 16A in an area on a left side of the attention-calling display 16C by turning on a light source of the attention-calling displayer 11L. It is possible to display a point-shaped attention-calling display 16B or a concentric pattern of attention-calling display 16B in an area on the right side of the attention-calling display 16C by turning on a light source of the attention-calling displayer 11R.

Accordingly, it is possible to selectively use three attention-calling displays 16A, 16B, and 16C, or to form an attention-calling display in the entire area of a relatively wide range in the rightward and leftward direction.

<Configuration Example of Electric Circuit>

Figure 18:
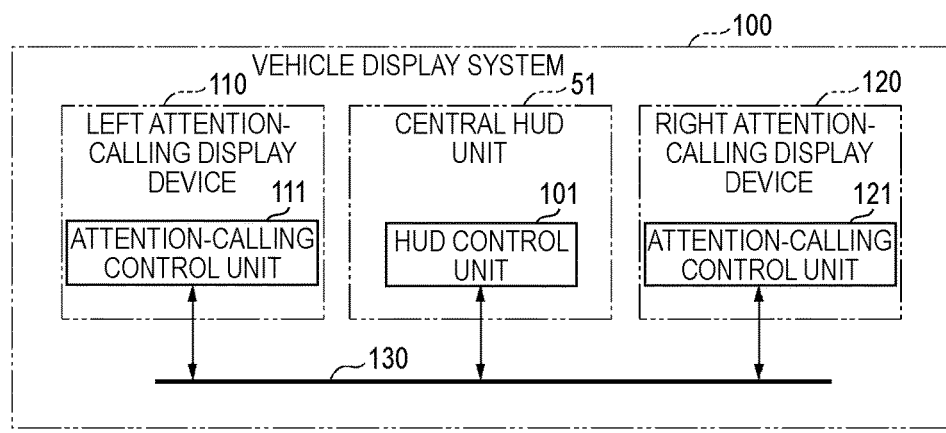
FIG. 18 is a block diagram illustrating a configuration example of an electric circuit of the vehicle display system.

FIG. 18 illustrates a configuration example of an electric circuit of the vehicle display system 100 illustrated in FIGS. 15 to 17.

As illustrated in FIG. 18, the vehicle display system 100 includes a left attention-calling display device 110 including an attention-calling control unit 111 that controls the attention-calling displayer 11L, the HUD unit 51, and a right attention-calling display device 120 including an attention-calling control unit 121 that controls the attention-calling displayer 11R. The HUD unit 51 includes a built-in HUD control unit 101 that is capable of controlling the light source 59a.

The attention-calling control unit 111, the HUD control unit 101, and the attention-calling control unit 121 are connected to each other via an in-vehicle communication network 130 so as to be capable of communicating with other. Accordingly, the vehicle display system 100 is capable of executing control such that the attention-calling display device 110, the HUD unit 51, and the attention-calling display device 120 coordinate with each other.

In a case where the vehicle display system 100 is configured such that the attention-calling display devices 110 and 120 and the HUD unit 51 are combined together, various modifications of the configuration can be considered. For example, instead of the attention-calling control units 111 and 121 and the HUD control unit 101, a single control device may collectively control all of the attention-calling display devices 110 and 120 and the HUD unit 51.

<Description of Main Operations>
<Adjustment of Projection Direction According to Position of Eye Point>

Figure 19:
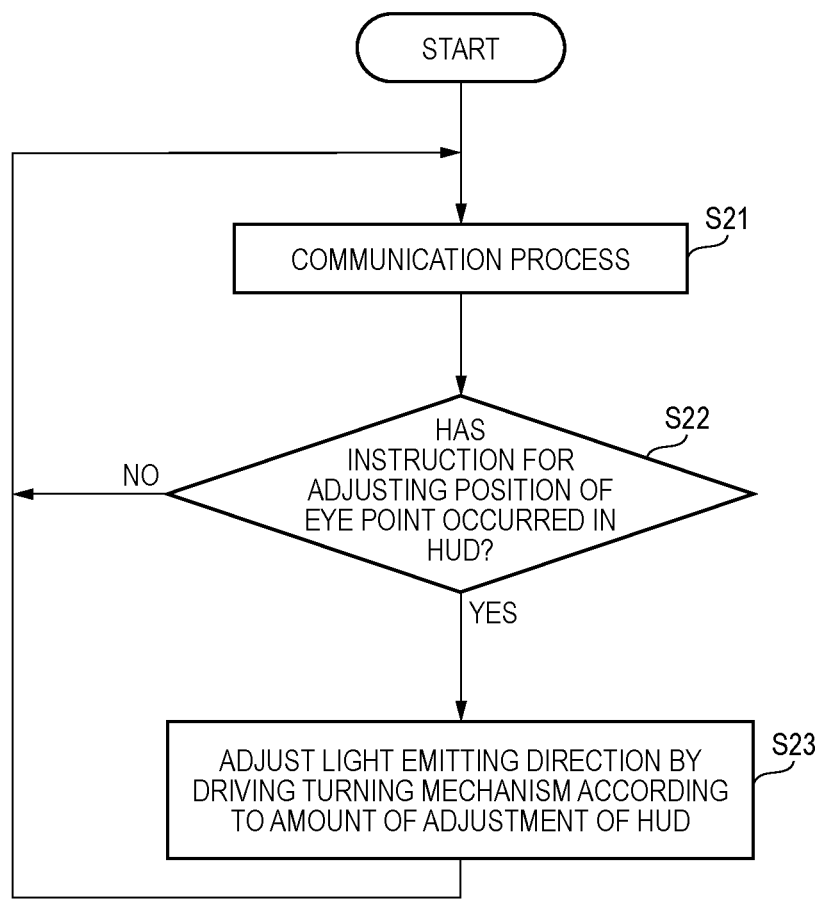
FIG. 19 is a flowchart illustrating an operation example of the vehicle display system.

FIG. 19 illustrates an operation example of the vehicle display system 100. That is, it is possible to realize a cooperative operation with the HUD unit 51 which is related to the adjustment of a projection direction according to the position of the eye point, by executing control illustrated in FIG. 19 via the attention-calling control unit 111 or the attention-calling control unit 121 illustrated in FIG. 18.

For example, if the position of the eye point EP of the driver is changed, there is a possibility that the driver cannot observe a virtual image of a display image projected by the HUD unit 51. Accordingly, a function of adjusting the projection direction according to the eye point EP of the driver may be incorporated into the HUD unit 51. For example, if an in-vehicle camera capable of capturing an image of the position of the face of the driver is installed, it is possible to detect the position of the eyes of the driver from the captured image. Therefore, it is possible to correct the position of the eye point assumed by the HUD unit 51, and to automatically adjust the projection direction of the HUD unit 51. The driver can also adjust the projection direction by manually operating a switch or the like.

In an environment in which the HUD unit 51 adjusts the projection direction (the direction 54 in FIG. 15), the attention-calling display devices 110 and 120 are also required to concurrently adjust light emitting directions (52 and 53) related to the attention-calling display 16. In a case where the respective projection directions of the HUD unit 51 and the attention-calling display devices 110 and 120 are individually adjusted, the number of operation switches increases, and an operation performed by the driver becomes complicated. Since execution of the control illustrated in FIG. 19 enables the devices and the unit to coordinate with each other, it is not necessary to individually perform adjustment operations.

In Step S21 illustrated in FIG. 19, the attention-calling control unit 111 communicates with the HUD control unit 101 and the attention-calling control unit 121 via the in-vehicle communication network 130, and exchanges various information items therewith.

In Step S22, the attention-calling control unit 111 determines whether an instruction for adjusting the projection direction according to the position of the eye point (EP) occurs in the HUD unit 51, based on the information acquired from the HUD control unit 101 in S21. In a case where the occurrence of the instruction for adjustment is recognized, the process proceeds to next S23.

In Step S23, the attention-calling control unit 111 acquires the amount of adjustment of the projection direction of the HUD unit 51 according to the position of the eye point from the HUD control unit 101, and the attention-calling control unit 111 drives a turning mechanism of the attention-calling displayer 11L based on the amount of adjustment. Accordingly, the light emitting direction 52 of light from the attention-calling displayer 11L is changed, and is corrected to a direction suitable for the latest position of the eye point EP of the driver.

<Control According to Sections of Attention-Calling Area>

Figure 20:
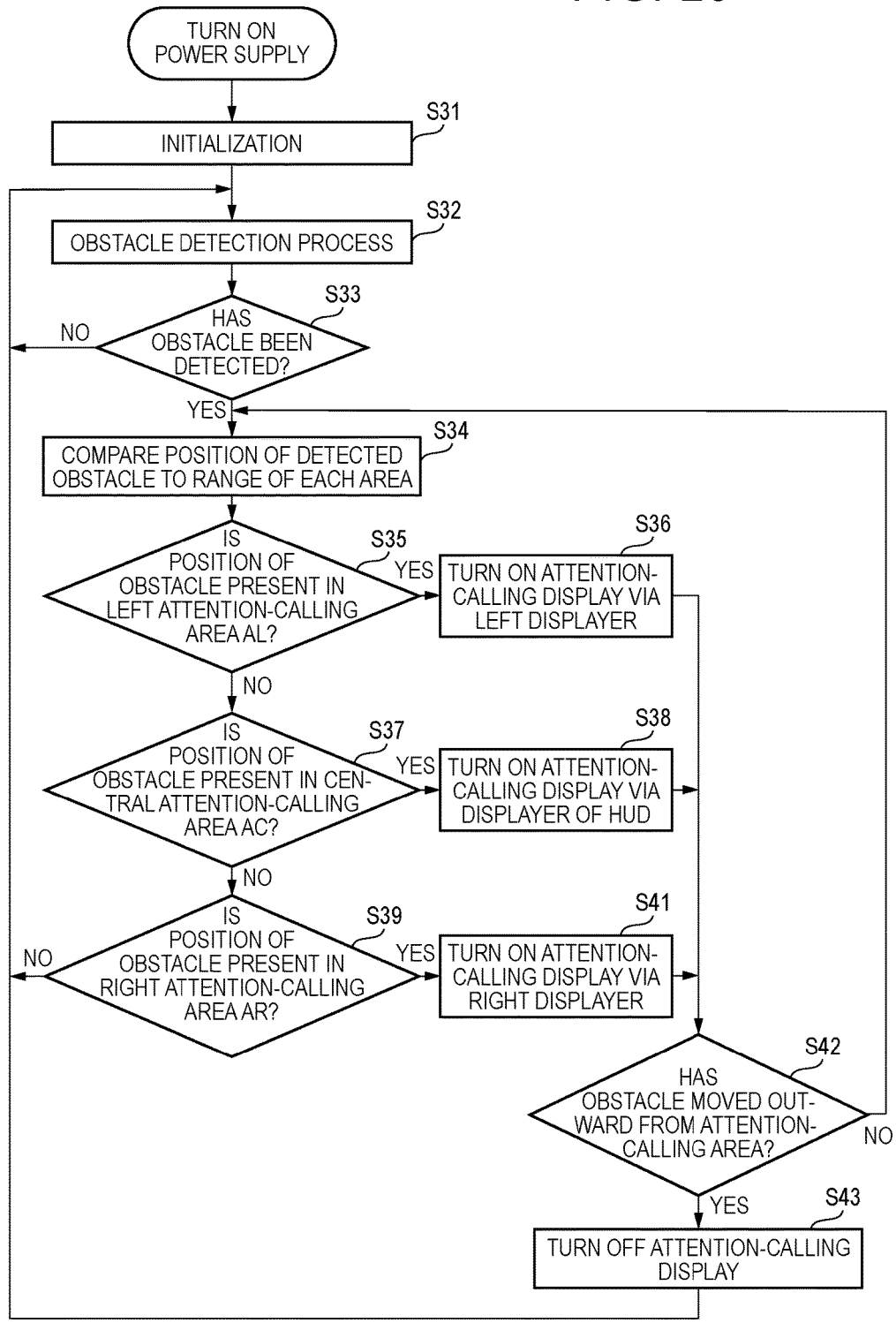
FIG. 20 is a flowchart illustrating an operation example of the vehicle display system.

FIG. 20 illustrates an operation example of the vehicle display system 100. That is, it is possible to make the units coordinate with each other and to make the units execute operations according to sections of an attention-calling area by executing control illustrated in FIG. 20 via the attention-calling control unit 111 or the attention-calling control unit 121 when displaying the attention-calling display 16.

That is, control is performed to selectively use the attention-calling display 16A displayed by the attention-calling displayer 11L, the attention-calling display 16C displayed by the HUD unit 51, and the attention-calling display 16B displayed by the attention-calling displayer 11R (refer to FIG. 17).

For example, in a case where the position of the attention target 28a in the rightward and leftward direction detected as illustrated in FIG. 17 is present in a range in which the attention-calling display 16A displayed by the attention-calling displayer 11L can be moved, and the attention target 28a is closer in distance to the attention-calling display 16A than the other attention-calling displays 16C and 16B, control is performed such that the attention-calling display 16A is selectively used. Similarly, in a case where the position of the detected attention target 28a in the rightward and leftward direction is present in a range in which the attention-calling display 16B displayed by the attention-calling displayer 11R can be moved, and the attention target 28a is closer in distance to the attention-calling display 16B than the other attention-calling displays 16C and 16A, control is performed such that the attention-calling display 16B is selectively used. In a case where the position of the detected attention target 28a in the rightward and leftward direction is present in the vicinity of the attention-calling display 16C, the attention-calling display 16C is selectively used.

The following description will be given based on the assumption that the attention-calling control unit 111 of the attention-calling display device 110 executes the control illustrated in FIG. 20.

If a power supply of the attention-calling display device 110 is turned on, the attention-calling control unit 111 executes initialization in Step S31. Accordingly, communication is initialized such that the attention-calling control unit 111, the attention-calling control unit 121, and the HUD control unit 101 are capable of communicating with each other via the in-vehicle communication network 130. The attention-calling display device 110 turns off its own attention-calling display 16A, and instructs the attention-calling control unit 121 and the HUD control unit 101 to turn off the other attention-calling displays 16C and 16B. The position of the attention-calling displayer 11L in the forward and rearward direction and the position of the attention-calling displayer 11L in a turning direction are respectively moved to initial positions determined in advance.

In Step S32, the attention-calling control unit 111 detects an obstacle (object) such as the attention target 28a illustrated in FIG. 17 ahead of the host vehicle by processing information regarding a video captured by the in-vehicle camera 41, and executing pattern recognition. In a case where an obstacle is detected, the process proceeds from Step S33 to Step S34.

In Step S34, the attention-calling control unit 111 compares the position of the obstacle detected in S32 to the respective positions of attention-calling areas AL, AC, and AR of three types which are determined in advance.

In the example illustrated in FIG. 17, the attention-calling area AC is assigned as a range of area in the rightward and leftward direction in which the attention-calling display 16C is displayed. The attention-calling area AL is positioned on a left side of the attention-calling area AC, and is assigned as a range of area in the rightward and leftward direction in which the attention-calling display 16A can be displayed. The attention-calling area AR is positioned on the right side of the attention-calling area AC, and is assigned as a range of area in the rightward and leftward direction in which the attention-calling display 16B can be displayed.

In a case where the position of the detected obstacle is present in the left attention-calling area AL, the process proceeds from S35 to S36. In a case where the position of the detected obstacle is present in the central attention-calling area AC, the process proceeds from S37 to S38. In a case where the position of the detected obstacle is present in the right attention-calling area AR, the process proceeds from S39 to S41.

In Step S36, the attention-calling control unit 111 controls the light source 45 inside of the attention-calling displayer 11L such that the light source 45 is energized, and the state of the light source 45 is switched to a light-emitting state. Accordingly, light emitted from the light source 45 is emitted from the attention-calling displayer 11L, is reflected by the surface of the front windshield 22, and is incident on the eye point EP of the driver. That is, the driver can observe the attention-calling display 16A.

In Step S38, the attention-calling control unit 111 instructs the HUD control unit 101 such that the state of the central attention-calling display 16C is switched to a display state. In this case, a turn-off state of the attention-calling display 16A displayed by the attention-calling displayer 11L is maintained, and a turn-off state of the attention-calling display 16B displayed by the attention-calling displayer 11R is maintained.

In Step S41, the attention-calling control unit 111 instructs the attention-calling control unit 121 such that the state of the right attention-calling display 16B is switched to a display state. In this case, a turn-off state of the attention-calling display 16A displayed by the attention-calling displayer 11L is maintained, and a turn-off state of the attention-calling display 16C displayed by the HUD unit 51 is maintained.

In Step S42, the attention-calling control unit 111 monitors a change in the position of the obstacle detected in S32, and determines whether the latest position of the obstacle is moved outward from the three attention-calling areas AL, AC, and AR. In a case where the position of the obstacle is present inside of the "attention-calling area", the attention-calling control unit 111 returns to S34, and controls the display position of the attention-calling display 16 such that the display position of the attention-calling display 16 follows the latest position of the obstacle.

In a case where the position of the obstacle is moved outward from the attention-calling areas AL, AC, and AR, in next S43, the attention-calling control unit 111 performs control such that all of the attention-calling displays 16A, 16C, and 16B are turned off.

When displaying an attention-calling warning by light emission of a light source, each of the vehicle light emitting display devices in the first to third embodiments is capable of freely changing a display position in the vertical direction. Accordingly, it is possible to control the display position without preparing many light sources.

The aforementioned characteristics of the vehicle light emitting display device and the vehicle display system in the embodiments of the present invention will be simply summarized in (1) to (13) below.

(1) A vehicle light emitting display device comprising:
at least one light source 45 which can be controlled to turn on and off; and
a light reflecting member (a front windshield 22) disposed in front of a driver of a vehicle,
wherein the vehicle light emitting display device 10A, 10B forms a virtual image (an attention-calling display 16) which can be observed by the driver, by emitting light of the light source from lower side of an instrument panel 21 of the vehicle toward the light reflecting member, and
wherein the vehicle light emitting display device further comprises:
a forward and rearward movable mechanism (the belt-shaped support member 12) that freely moves a position, at which light is emitted from the light source toward the light reflecting member, in a forward and rearward direction which is a travel direction of the vehicle.

(2) The vehicle light emitting display device with the configuration described in (1), wherein the forward and rearward movable mechanism includes a belt-shaped support member 12 which is connected to a light emitting unit (the attention-calling displayer 11) including the light source, and which is deformed and freely moves so as to block an opening portion (the instrument panel opening portion 27) formed in the instrument panel.

(3) The vehicle light emitting display device with the configuration described in (2), wherein the belt-shaped support member is formed by connecting together two types of materials (the hard material portion 14 and the flexible material portion 15) which are alternately disposed along a longitudinal direction of a belt shape, and
wherein at least one of the two types of materials has flexibility.

(4) The vehicle light emitting display device with the configuration described in (2) or (3), wherein the vehicle light emitting display device further comprises:
guide members (bezels 25, 26) that respectively include guide grooves 25a, 26a which support both end portions of the belt-shaped support member in the longitudinal direction and guide the belt-shaped support member along a predetermined movement path.

(5) The vehicle light emitting display device with the configuration described in any one of (1) to (4), wherein the vehicle light emitting display device further comprises:
an attention-calling display control unit (control unit 42) which controls the light source to turn on or blink in a case where a target (the attention target 28a) to be called for attention is detected in a vicinity of a position of the displayed virtual image.

(6) The vehicle light emitting display device with the configuration described in (5), wherein the attention-calling display control unit drives the forward and rearward movable mechanism so as to control to move the position of the displayed virtual image in a direction closing to a position of the target, in order to form and display the virtual image.

(7) The vehicle light emitting display device with the configuration described in any one of (2) to (4), wherein the light emitting unit further includes a reflective optical member (the magnifying mirror 11c) that reflects light emitted from the light source and guides the light toward the light reflecting member.

(8) The vehicle light emitting display device with the configuration described in (7), wherein the light emitting unit includes at least one annular optical member (the light ring 11b) that is formed into an annular shape larger than an outer diameter of the light source and guides light emitted from the light source toward the reflective optical member by transmitting, reflecting, or diffusing.

(9) The vehicle light emitting display device with the configuration described in (8), wherein the light emitting unit includes a plurality of the annular optical members having different sizes, and wherein the annular optical members are disposed such that the sizes of the annular optical members increase in sequence from a position of the light source toward a position of the reflective optical member.

(10) The vehicle light emitting display device with the configuration described in any one of (2) to (4) and (7) to (9), wherein the light emitting unit includes a turning mechanism that adjusts a direction A3 of light emitted from the light emitting unit toward the light reflecting member according to a direction A2 around an axis of light in a travel direction of light emitted from the light source.

(11) A vehicle display system 100 comprising:

the vehicle light emitting display device (the attention-calling displayer 11L, 11R) which is a configuration described in any one of (1) to (10); and a HUD unit 51, wherein the vehicle light emitting display device is disposed on a side of the HUD unit.

(12) The vehicle display system described in (11), wherein the vehicle display system further comprises:

a coordinated display control unit (an attention-calling control unit 111) that controls a display position of the vehicle light emitting display device in coordination with an adjustment of a display position of the HUD unit.

(13) The vehicle display system described in (11), wherein the vehicle display system further comprises:

a coordinated display control unit (an attention-calling control unit 111) which controls any one of the vehicle light emitting display device and the HUD unit to selectively display information according to a position of a detected target in a rightward and leftward direction, in a case where a target to be called for attention is detected.

The present invention has been described in detail with reference to the specific embodiments, and it is apparent to persons skilled in the art that various changes or corrections can be made to the embodiments insofar as the changes or the corrections do not depart from the concept and scope of the present invention.

DESCRIPTION OF REFERENCE NUMERALS AND SIGNS 10A, 10B: VEHICLE LIGHT EMITTING DISPLAY DEVICE
11, 11A, 11L, 11R: ATTENTION-CALLING DISPLAYER
11a: CENTER LIGHT
11b: LIGHT RING
11c: MAGNIFYING MIRROR
11d: BEZEL
11e: TRANSPARENT COVER
11f: HEAT SINK
12: BELT-SHAPED SUPPORT MEMBER
13: CENTRAL MEMBER
14: HARD MATERIAL PORTION
15: FLEXIBLE MATERIAL PORTION
16: ATTENTION-CALLING DISPLAY
21: INSTRUMENT PANEL
22: FRONT WINDSHIELD
23: METER HOOD
24: BONNET
25, 26: BEZEL
25a, 26a: GUIDE GROOVE
27: INSTRUMENT PANEL OPENING PORTION
28: VEHICLE OUTSIDE SCENE
28a: ATTENTION TARGET
29: STEERING WHEEL
30: ATTENTION-CALLING DISPLAY
31: CENTRAL LIGHT EMITTING PORTION
32, 33, 34, 35: INTERMEDIATE ANNULAR DISPLAY PORTION
36: OUTER CIRCUMFERENTIAL DISPLAY PORTION
41: IN-VEHICLE CAMERA
42: CONTROL UNIT
43: LAMP DRIVER
44: MOTOR DRIVER
45: LIGHT SOURCE
46: ELECTRIC MOTOR
51: HUD UNIT
52, 53, 54: LIGHT EMITTING DIRECTION
59: HUD BEZEL
100: VEHICLE DISPLAY SYSTEM
101: HUD CONTROL UNIT
110, 120: ATTENTION-CALLING DISPLAY DEVICE
111, 121: ATTENTION-CALLING CONTROL UNIT
130: IN-VEHICLE COMMUNICATION NETWORK
A1: MOVEMENT DIRECTION
A2: TURNING DIRECTION
A3: LIGHT EMITTING DIRECTION
EP: EYE POINT OF DRIVER

What is claimed is:

1. A vehicle light emitting display device comprising:

at least one light source which can be controlled to turn on and off; and a light reflecting member disposed in front of a driver of a vehicle, wherein the vehicle light emitting display device forms a virtual image which can be observed by the driver, by emitting light of the light source from a lower side of an instrument panel of the vehicle toward the light reflecting member, and wherein the vehicle light emitting display device further comprises:

a forward and rearward movable mechanism that freely moves a position, at which light is emitted from the light source toward the light reflecting member, in a forward and rearward direction corresponding to a travel direction of the vehicle, wherein the forward and rearward movable mechanism includes a support member configured to deform between a first position in the forward and rearward direction and a second position in the forward and rearward direction, wherein the support member is formed by connecting together two types of materials which are alternately disposed along a longitudinal direction of the support member, and wherein at least one of the two types of materials has flexibility.

2. The vehicle light emitting display device according to claim 1, wherein the support member is a belt-shaped support member and is connected to a light emitting unit including the light source, the belt-shaped support member being freely movable so as to block an opening portion formed in the instrument panel.

3. The vehicle light emitting display device according to claim 2, wherein another of the two types of materials is rigid.

4. The vehicle light emitting display device according to claim 2, wherein the vehicle light emitting display device further comprises:
   guide members that respectively include guide grooves which support both end portions of the belt-shaped support member in a longitudinal direction of the belt-shaped support member and guide the belt-shaped support member along a predetermined movement path.

5. The vehicle light emitting display device according to claim 1, wherein the vehicle light emitting display device further comprises:
   an attention-calling display control unit which controls the light source to turn on or blink in a case where a target for which attention is to be called is detected in a vicinity of a position of the displayed virtual image.

6. The vehicle light emitting display device according to claim 5, wherein the attention-calling display control unit drives the forward and rearward movable mechanism so as to control movement of the position of the displayed virtual image in a direction toward a position of the target, in order to form and display the virtual image.

7. The vehicle light emitting display device according to claim 2, wherein the light emitting unit further includes a reflective optical member that reflects light emitted from the light source and guides the light toward the light reflecting member.

8. The vehicle light emitting display device according to claim 7, wherein the light emitting unit includes at least one annular optical member that is formed into an annular shape larger than an outer diameter of the light source and guides light emitted from the light source toward the reflective optical member by transmitting, reflecting, or diffusing.

9. The vehicle light emitting display device according to claim 8, wherein the light emitting unit includes a plurality of the annular optical members having different sizes, and
   wherein the annular optical members are disposed such that the sizes of the annular optical members increase in sequence from a position of the light source toward a position of the reflective optical member.

10. The vehicle light emitting display device according to claim 2, wherein the light emitting unit includes a turning mechanism that adjusts a direction of light emitted from the light emitting unit toward the light reflecting member according to a direction around an axis of light in a travel direction of light emitted from the light source.

11. A vehicle display system comprising:
    the vehicle light emitting display device according to claim 1; and
    a head-up display unit,
    wherein the vehicle light emitting display device is disposed on a side of the head-up display unit.

12. The vehicle display system according to claim 11, wherein the vehicle display system further comprises:
    a coordinated display control unit that controls a display position of the vehicle light emitting display device in coordination with an adjustment of a display position of the head-up display unit.

13. The vehicle display system according to claim 11, wherein the vehicle display system further comprises:
    a coordinated display control unit which controls any one of the vehicle light emitting display device and the head-up display unit to selectively display information according to a position of a detected target in a rightward and leftward direction, in a case where a target to be called for attention is detected.

* * * * *